United States Patent Office 3,018,256
Patented Jan. 23, 1962

---

3,018,256
PRODUCTION OF RIGID FOAMED POLY-ESTERURETHANE PLASTICS
Mitchell Borr and Kenneth E. MacPhee, Guelph, Ontario, Canada, assignors to United States Rubber Company, New York, N.Y., a corporation of New Jersey
No Drawing. Filed July 10, 1958, Ser. No. 747,597
3 Claims. (Cl. 260—2.5)

This invention relates to the production of rigid foamed plastics by the reaction of polyisocyanates with polyesters possessing improved handling characteristics.

The usual method for the formation of rigid polyurethane foam is to react a diisocyanate, generally toluene diisocyanate, with a highly branched polyester resin in the presence of a small amount of water. Catalysts, emulsifying agents, flame resistant agents and other additives may also be incorporated in the foaming mixture. On mixing together the ingredients, simultaneous generation of carbon dioxide and cross-linking of the resin occur, resulting in a foamed structure. The polyester (alkyd resin) employed is prepared by conventional methods involving the esterification of one or more di- or higher polycarboxylic acids with one or more di- or higher polyhydric alcohols. The molar ratio of alcohol to acid is generally such that the polyester contains a larger proportion of hydroxyl than carboxyl end groups. Examples of this type of polyester formulation are given in Example 1 below. The polyesters prepared in this manner are characterized by very high viscosity, and difficulty has been experienced in properly mixing the viscous polyester with the other components of the foaming formulation, which is essential to the production of good quality foams with uniform cell structure and strength properties. The high viscosity is a particular disadvantage when foam machine or spray gun techniques are used for foam production. Often it is necessary to preheat the polyester in order to reduce the viscosity down to a consistency which can be handled.

An object of this invention is to provide materials which possess improved viscosity characteristics to facilitate handling in batch type and continuous equipment, and which are capable of producing rigid foamed plastics with low, controllable density and high strength properties.

It has been found that a polyester with the desired properties can be prepared by properly selecting the ester-forming materials and carrying out the esterification reaction in two stages, to produce a polyfunctional polyester composed of molecules of relatively uniform molecular weight, as contrasted with the wide distribution in molecular weights found in conventional polyesters, where all the reactants are introduced at the start and the reaction is continued to the desired acid number in one step. In the preparation of the polyesters of the present invention, about one equivalent of a polyhydric alcohol (I) having three or more hydroxyl groups is reacted to substantial completion with about two equivalents of a dibasic acid (II), and the resulting product (III) from this reaction (stage A) is then reacted further in a second stage (stage B) with about two equivalents of a glycol (IV) to yield the final polyester (V). By the term equivalent is understood the weight of polyhydric alcohol or glycol per hydroxyl group or the weight of dibasic acid per carboxyl group. It is an essential characteristic of the intermediate ester III that its terminal groups be chiefly carboxyl groups.

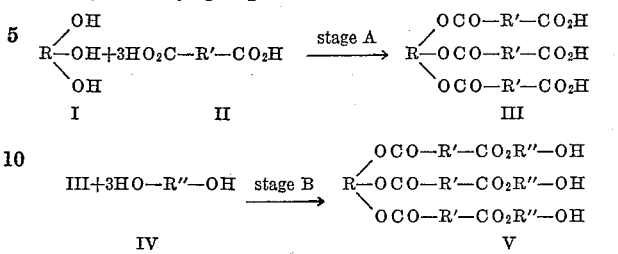

Thus, reaction of one equivalent (or one-third mole) of tri-methylolethane (VI) with about two equivalents (or about one mole) of adipic acid (VII), followed by a second stage in which the product (VIII) is reacted with about two equivalents (or about one mole) of ethylene glycol (IX), yields a fluid product which consists predominantly of the polyester triol possessing Formula X.

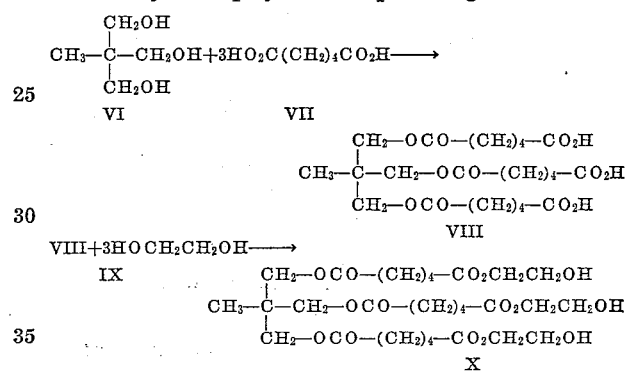

Theoretically, a polyester of Formula X should have a hydroxyl number of 264 and an acid number of zero. A representative polyester prepared in the laboratory had a hydroxyl number of 240 and an acid number of 1.5.

If the second stage of the above polyesterification, stage B, is stopped before all the carboxyl groups of the intermediate (III) are esterified, and the unreacted glycol (IV) removed by standard procedure, e.g. by vacuum stripping, then there will be present in the final product material with free carboxyl groups, such as may be represented by Formula XI.

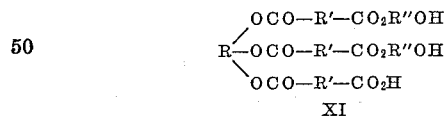

Therefore, by controlling the extent of reaction in stage B of the polyesterification it is possible to control the ratio of hydroxyl to carboxyl groups in the product. In practice, we prefer to conduct the reaction to substantial completion, usually to an acid number below 30 and often to an acid number close to zero (e.g., 0.5 to 3), thus producing a polyester of essentially the general formula V, having a hydroxyl number and a molecular weight that will vary depending on the specific starting materials. To hasten the reaction, and to minimize chain extension side reactions, we generally employ an amount of glycol in excess over the stoichiometric amount in stage B (e.g. about 2.1 to 2.4 equivalents [1.05 to 1.2 moles] of glycol per equivalent [⅓ mole] of intermediate polyester III, that is, about 0.1 to 0.4 equivalents [0.05 to 0.2 mole] excess of glycol), removing the excess at the end of the reaction by vacuum topping or other means known to the art. However, it is not absolutely essential to employ an excess and we can use 2 equivalents (1 mole) of glycol per equivalent (⅓ mole) of intermediate polyester.

In preparing the intermediate polyester (III or VIII) we bring the reaction substantially to completion to yield a polyester having a hydroxyl number of substantially zero, at least in theory, although in actual practice the hydroxyl number may vary somewhat, largely because the precision of the method is poor for polyesters of this kind. (In a typical case repeated determination of hydroxyl number on the same material yielded values of +3.5, −8, +9, and −10. This is regarded as substantially zero hydroxyl number for the present purposes.) Usually we prefer to follow the extent of reaction by measuring the acid number at intervals, terminating the reaction when the acid number reaches a value equal to that calculated from the theoretical formula (III or VIII), the exact value depending on the specific starting materials.

The polyhydric alcohols which are useful in the practice of this invention are any and all alcohols containing three or more hydroxyl groups per molecule, such as trimethylolethane, trimethylolpropane, glycerol, hexanetriol pentaerythritol, mannitol, sorbitol, etc. Either a single polyhydric alcohol or a combination of two or more different polyhydric alcohols may be used in the polyester preparation. Organic dibasic acids in general such as oxalic, succinic, adipic, phthalic, isophthalic, terephthalic, chlorendic and maleic acids, or their anhydrides, are suitable for reaction with the polyhydric alcohol, and may also be used singly or in combination.

Glycols which may be employed in the last stage of the polyesterification include ethylene glycol, propylene glycol, and polymers thereof such as diethylene and dipropylene glycol, p-dimethylolbenzene,

4,4'-isopropylidenebis-(betaphenoxyethanol):

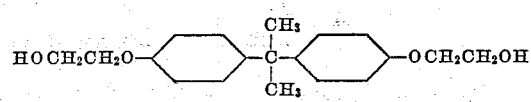

and diols in general. In some instances it may be desirable to use a mixture of two or more glycols.

Polyesters prepared in the manner described above are syrupy liquids of relatively low viscosity which can be mixed easily in batch type and continuous mixing equipment, and which are especially adapted to the production of tough, rigid, non-friable urethane foam in densities as low as about 2 lb./cu. ft. One method of producing a foamed material consists in simply mixing the polyisocyanate (1 isocyanate equivalent, i.e., amount obtained by dividing the molecular weight of the polyisocyanate by the number of isocyanate groups present with the polyester (0.2 to 1.0 equivalent, or 0.067 to ⅓ mole), water (0.1 to 1.0 equivalent or 0.05 to 0.5 mole), catalyst and an emulsifying agent, pouring the resulting mixture into a cavity or mold and allowing expansion to take place. Usually we prefer to use 0.9 to 1.0 total equivalents of polyester plus water per equivalent of polyisocyanate. By the term equivalent of polyester is meant the weight of polyester per reactive group (i.e. hydroxyl and carboxyl). An equivalent weight of the polyisocyanate is its weight per isocyanate group, while an equivalent of water is the weight of water which will react with one equivalent of isocyanate (i.e., one-half the molecular weight, since water is bifunctional, that is, one molecule of water is capable of reacting with two isocyanate groups). The foamed product is allowed to cure to a rigid state by allowing to stand either at ambient temperature or at elevated temperatures. If desired, the polyester may be premixed with water, catalyst, emulsifying agent and/or other additives before blending with the polyisocyanate. The density of the foam is controlled by the relative amounts of water, polyester and polyisocyanate employed. Lower densities require more water, and less polyester for a given amount of polyisocyanate.

A preferred method for producing foamed products from the polyester involves combination of the polyester with a prepolymer. The prepolymer is formed by reacting the polyester with a large excess of diisocyanate at an elevated temperature. The reactions involved in the formation of the prepolymer are complex. The primary reaction is that occurring between the hydroxyl groups of the polyester and the isocyanate to form urethane groups. Since a large excess of diisocyanate is present the hydroxyl terminals of the polyester are thus converted to isocyanate terminals. A small number of carboxyl groups may be present in the polyester which react with isocyanate to yield amide linkages. Any trace of water present in the polyester reacts with isocyanate to form ureas. The urethane, urea and amide groups formed contain active hydrogen and at the high temperature employed are capable of further reaction with isocyanate to produce branching. The extent of reaction can be controlled by the reaction conditions, i.e. the reaction temeprature (e.g., frequently about 120 to 150° C.) and heating time (e.g., frequently about 0.5 to 3 hrs.). This affects the viscosity of the product. The viscosity is also dependent on the amount of excess isocyanate employed. Therefore, by controlling the reaction conditions and the isocyanate excess employed, the amount of branching and the viscosity of the prepolymer can be controlled. Normally we prefer to use in the neighborhood of 6 to 10 equivalents of isocyanate (3 to 5 moles of diisocyanate) to one equivalent of combined hydroxyl and carboxyl in the polyester. The resulting prepolymer is a syrupy liquid of easily handled viscosity and has good stability if stored out of contact with moisture. Since an excess of isocyanate is employed in the preparation, the prepolymer still has free isocyanate present which is capable of further reaction with added polyester and water. A foamed product is produced by mixing the prepolymer (one equivalent) with additional polyester (0.1 to 1.0 equivalent or 0.033 to ⅓ mole) which has been premixed with water (0.1 to 1.0 equivalent or 0.05 to 0.5 mole), catalyst, foam stabilizer and any other desired additives, pouring the mixture into a mold and allowing the foaming action to take place. Usually we prefer to use 0.9 to 1.0 total equivalents of polyester plus water per equivalent of prepolymer (an equivalent of the prepolymer being the weight of prepolymer composition per isocyanate group and being numerically equal to the "isocyanate equivalent" determined for example as described in Example 4 below). The resultant foam sets to a rigid material on standing at room temperature, or may be cured at elevated temperatures if desired. The composition of the polyester used in the polyester-prepolymer foam formulation may be the same as, or different from, the composition of the polyester employed in the preparation of the prepolymer.

Any organic polyisocyanate conventionally used in making polyurethane foams may be employed. For example, we may employ polymethylene diisocyanates such as ethylene diisocyanate, hexamethylene diisocyanate and tetramethylene diisocyanate; alkylene diisocyanates such as propylene-1,2-diisocyanates; cycloalkylene diisocyanates such as 1,4-diisocyanatocyclohexane, as well as aromatic diisocyanates such as m- and p-phenylene diisocyanate, toluene diisocyanate, p,p'-diphenyl diisocyanate and 1,5-naphthalene diisocyanate, in which category we include aliphatic-aromatic diisocyanates such as p,p'-diphenylmethane diisocyanate and phenylethane diisocyanate

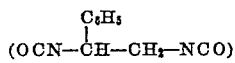
(OCN—CH—CH₂—NCO)

Triisocyanates are also suitable, such as those having isocyanate groups attached to a trivalent hydrocarbon radical, whether an aliphatic, aromatic, or aliphatic-aromatic radical as in butane-1,2,2-triisocyanate, benzene-1,3,5 - triisocyanate, diphenyl-2,4,4' - triisocyanate, diphenyl - 4,6,4'-triisocyanate, toluene-2,4,6-triisocyanate, ethyl benzene-2,4,6-triisocyanate and triphenylmethane-4,4',4''-triisocyanate. Polyisocyanates derived from corresponding substituted hydrocarbon radicals, such as monochlorobenzene - 2,4,6-triisocyanate, may also be used. The polyisocyanate made by reacting toluene diisocyanates with trimethylol propane or similar triols may be used. The polymethylene polyphenylisocyanate of the following formula may be used:

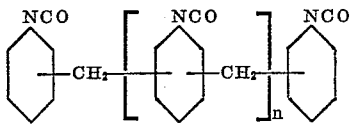

(where $n=1$ to 3 average). Either a single polyisocyanate or a combination of two or more different polyisocyanates may be used.

EXAMPLE 1

The alkyds or polyesters listed in Table 1, which are based on representative formulations found in the literature, are included here in order to form a comparison between the polyesters of the present invention and conventional polyester resins recommended for rigid urethane foam production.

Table 1

|  | A | B | C | D | E |
| --- | --- | --- | --- | --- | --- |
| Adipic acid moles | 3 | 3 | 2.5 | 2.5 | 2.5 |
| Phthalic anhydride moles |  |  | 0.5 | 0.5 | 0.5 |
| Trimethylolethane moles | 4.2 | 4.2 | 4.0 | 4.0 |  |
| Trimethylolpropane moles |  |  |  |  | 4.0 |
| Acid number | 29 | 1.2 | 37 | 12 | 37 |
| Hydroxyl number | 462 | 481 | 428 | 409 | 425 |

The alkyds were prepared in the usual manner by heating a mixture of the reactants with agitation until the desired acid number was obtained. Removal of water of reaction was facilitated by bubbling a slow stream of nitrogen through the mixture. The polyester products obtained were exceedingly viscous and difficult to mix and pour.

EXAMPLE 2

This example illustrates, in contrast to Example 1, a two-stage polyester prepared from trimethylolethane, adipic acid and ethylene glycol: A mixture of 432 g. (3.6 moles) of trimethylolethane and 1578 g. (10.8 moles) of adipic acid was heated in a 3-liter resin flask equipped with a stirrer, gas inlet tube, a short column and thermometer. The temperature was raised gradually to 190° C. and maintained at 190–200° C. until an acid number of 330–334 was obtained (theoretical 334). A slow stream of nitrogen was bubbled through the reaction mixture to aid in the removal of water of esterification. Ethylene glycol (737 g., 10.8 moles plus 10% excess) was added, the mixture was heated to 190° C. and maintained at 190–200° C. until an acid number of about 3–4 was obtained. Vacuum was then applied by means of a water aspirator and excess glycol was distilled off by heating at 190–200° C. under reduced pressure for 1½ hours. The product was a syrupy liquid with a Gardner viscosity at room temperature of Z2–Z3, an acid number of 1.5–1.7 and an hydroxyl number of 234–244. The low viscosity permitted very easy handling of the material in foam formulating, whether by batch mixing, machine foaming, or spraying techniques.

EXAMPLE 3

This example also illustrates a two-stage polyester prepared from trimethylolethane, adipic acid and ethylene glycol: A 20 gallon, glass-lined, jacketed Pfaudler reactor was used for this preparation. Dowtherm oil was employed in the jacket as the heating medium. Trimethylolethane (22.0 lb., 0.183 mole) and adipic acid (80 lb. 8 oz., 0.550 mole) were charged to the vessel through a loading port. The oil circulation through the jacket was started and the temperature was raised to about 120° C. with intermittent stirring of the mixture. At this temperature the charge became molten and the batch could be agitated continuously. A slow stream of inert gas was bubbled through the mixture during the reaction. The temperature was increased to 200–210° C. and the water of esterification was condensed and removed from the reaction. Reaction was continued to an acid number of 330–334 (theory 334). At this point ethylene glycol (37 lb. 10 oz., 0.550 mole plus 10% excess) was charged to the reactor. The temperature, which dropped due to the addition of the glycol, was again increased to 200–210° C. and maintained until an acid number of 3–5 was reached. Vacuum (25 in. mercury) was applied for 1½ hours to remove the excess glycol. The liquid product had the following properties: viscosity at 25° C., 40–50 poise; acid number, 1–2; hydroxyl number, 230–240.

EXAMPLE 4

Preparation of prepolymer: A prepolymer was prepared from a polyester made as in Example 2 (acid number, 1.6; hydroxyl number, 240; equivalent weight calculated from combined acid and hydroxyl number, 233) and toluene diisocyanate (a commercial product which is a mixture of approximately 65% 2,4-toluene diisocyanate and 35% 2,6-toluene diisocyanate). The toluene diisocyanate (1253 g., 14.4 equivalents) was added to polyester (419 g., 1.8 equivalents) contained in a 3-necked flask provided with a stirrer and thermometer. A blanket of nitrogen was maintained over the surface of the mixture to exclude moisture. Stirring was started and the mixture was allowed to exotherm for one hour. A heating mantel was then placed under the reaction flask and the temperature was raised slowly over a period of one hour to 140° C. and kept at 140° C. for 1½ hours. The product was a light yellow liquid of relatively low viscosity, Gardner Z4 at room temperature, which could be blended easily with polyester. The isocyanate equivalent of the product was 157. The isocyanate equivalent gives a measure of free isocyanate present, and may be measured in terms of the number of grams of material which reacts with one gram mole of a secondary amine. The procedure for the determination of the isocyanate equivalent consisted in adding 2N di-n-butylamine in redistilled toluene to a sample of prepolymer dissolved in dioxane (which had been refluxed over sodium and distilled), allowing the mixture to stand at room temperature for one-half hour, and titrating the excess di-n-butylamine with standard hydrochloric acid.

EXAMPLE 5

Preparation of prepolymer: The reaction was carried out in a 10-gallon, stainless steel, agitated vessel which was purged with nitrogen prior to loading. Polyester prepared as in Example 3 (15 lb., 0.063 equivalent) and 65/35 toluene diisocyanate (43 lb. 11 oz., 0.502 equivalent) were charged to the reactor. The mixture was allowed to exotherm for one hour with agitation. At the end of this time the temperature was raised gradually to 140° C. The reaction mixture was held at this temperature for one hour or until a viscosity of 80–90 poises was reached. The product was then cooled to room temperature and stored in purged, sealed containers.

EXAMPLE 6

Two-stage polyester from trimethylolethane, adipic acid, phthalic anhydride and ethylene glycol: A mixture of trimethylolethane (420 g., 3.5 moles), adipic acid (1023 g., 7.0 moles) and phthalic anhydride (518 g., 3.5 moles) was heated at 190–200° C. in the manner described in Example 2 above. When an acid number of 298 was reached, ethylene glycol (717 g., 11.55 moles) was added and the reaction was continued at 190–200° C. until an acid number below 20 was obtained. Excess glycol was removed under reduced pressure and the product was cooled to room temperature. The resultant polyester had a Gardner viscosity at room temperature of about Z6, acid number 13.5 and hydroxyl number 236.

EXAMPLE 7

Two-stage polyester from trimethylolethane, adipic acid, chlorendic anhydride (1,4,5,6,7,7-hexachlorobicyclo [2.2.1]-5-heptene-2,3-dicarboxylic anhydride) and ethylene glycol: A mixture of trimethylolethane (300 g., 2.5 moles), adipic acid (822 g., 5.625 moles) and chlorendic anhydride (695 g., 1.875 moles) was heated at about 180° C. to acid number 250. Ethylene glycol (513 g., 8.25 moles) was added to the reaction mixture and heating was continued until an acid number below 29 was attained. Vacuum was applied and excess glycol was distilled over. The product was a brown liquid of acid number 19 and hydroxyl number 228, which possessed a somewhat higher viscosity than the polyesters of Examples 2, 3 and 6, but which was still readily stirred and poured at room temperature.

EXAMPLE 8

Two-stage polyester from trimethylolethane, adipic acid and diethylene glycol: A mixture of trimethylolethane (360 g., 3.0 moles) and adipic acid (1315 g., 9.0 moles) was heated at 190–200° C. in the manner described in Example 2 above. When an acid number of 334 was reached, diethylene glycol (1003 g., 9.45 moles) was added and the reaction was continued at 190–200° C. until an acid number below 5 was obtained. Excess glycol was removed under reduced pressure and the product was cooled to room temperature. The resultant polyester had a Gardner viscosity at room temperature of Z1, acid number 3.2 and hydroxyl number 232.

EXAMPLE 9

Two-stage polyester from trimethylolpropane, adipic acid and ethylene glycol: A mixture of trimethylolpropane (483 g., 3.6 moles) and adipic acid (1578 g., 10.8 moles) was heated at 190–200° C. in the manner described in Example 2 above. When an acid number of 326 was reached, ethylene glycol (737 g., 11.88 moles) was added and the reaction was continued until an acid number below 3.5 was obtained. Excess glycol was removed under reduced pressure and the product was cooled to room temperature. The resultant polyester had a Gardner viscosity at room temperature of Z2, acid number 1.4 and hydroxyl number 238.

EXAMPLE 10

Foam formulations:

A

| | | |
|---|---|---|
| Polyester prepared as in Example 2 | g | 45.7 |
| Prepolymer prepared as in Example 4 | g | 65.0 |
| Water | g | 2.0 |
| N-ethyl morpholine | cc | 1.0 |
| Polydimethylsiloxane oil (mol. wt. 200, viscosity 50 centistokes: "DC-200" supplied by Dow-Corning Co.) | cc | 0.3 |

The silicone oil is a conventional "foam stabilizer" and controls the size and uniformity of the foam cells. The indicated amounts of water, N-ethyl morpholine and silicone fluid were premixed thoroughly with 45.7 g. of polyester. Mixing at a moderate rate for about 2 minutes is adequate. The required amount of prepolymer was then added and the mixture was stirred at high speed for 15–20 seconds, after which it was allowed to rise in place or poured into a mold and allowed to foam. Expansion was complete in 2–2½ minutes and after about one-half hour the foam was stiff enough to permit removal from the mold. Complete cure was achieved by allowing the foam to stand at room temperature for about 24 hours. The product had excellent cell structure, chiefly open cell, a density of 3.0 lb./cu. ft. and a compressive strength at 10% deflection of 29 p.s.i. After 7 weeks aging in an oven at 70° C. and 100% relative humidity the foam retains 95–100% of its initial compressive strength.

B

| | | |
|---|---|---|
| Polyester prepared as in Example 2 | g | 59.9 |
| Prepolymer prepared as in Example 4 | g | 65.0 |
| Water | g | 1.5 |
| N-ethyl morpholine | cc | 1.0 |
| Silicone fluid (polydimethylsiloxane, "DC-200") | cc | 0.3 |

The foaming procedure was the same as that employed in Example 10A. The product had excellent cell structure, a density of 4.8 lb./cu. ft. and a compressive strength at 10% deflection of 58 p.s.i.

C

| | | |
|---|---|---|
| Polyester prepared as in Example 2 | g | 34.5 |
| Prepolymer prepared as in Example 4 | g | 65.0 |
| Water | g | 2.5 |
| N,N-diethylcyclohexylamine | g | 0.75 |
| Silicone fluid (polydimethylsiloxane "DC-200") | cc | 0.3 |
| Tris-beta-chloroethyl phosphate | cc | 8.0 |

The water, diethylcyclohexylamine, silicone oil and tris-beta-chloroethyl phosphate were premixed with polyester. The prepolymer was added and the mixture was stirred vigorously for 15 seconds. It was then poured into a mold and permitted to rise, maximum height being reached in 1–1¼ minutes. Complete cure was effected by allowing to stand at room temperature about 24 hours. The product had excellent cell structure, a density of 2.0 lb./cu. ft., a compressive strength at 10% deflection of 14 p.s.i. and was fire resistant.

D

| | | |
|---|---|---|
| Polyester prepared as in Example 6 | g | 50.0 |
| Toluene diisocyanate | g | 31.8 |
| Water | g | 1.0 |
| N-ethyl morpholine | cc | 1.0 |
| Non-ionic wetting agent (condensation product of castor oil with ethylene oxide—"Emulphor EL-719" supplied by General Dyestuff Corp.) | g | 0.4 |

The water, N-ethyl morpholine and foam stabilizer ("Emulphor EL-719") were added to the polyester and mixed in thoroughly. The toluene diisocyanate (commercial 65/35 mixture of the 2,4/2,6 isomers) was then added and the mixture was stirred vigorously for about 30 seconds and poured into a lubricated mold. The foam attained full volume in about 1½ minutes. After about 5 minutes it had set to a non-tacky condition. To effect complete cure the foam was placed in an oven at 90° C. for about 2 hours. The cellular product possessed excellent cell structure, a density of 3.2 lb./cu. ft. and a compressive strength at 10% deflection of 63 p.s.i.

E

| | | |
|---|---|---|
| Polyester prepared as in Example 6 | g | 50.0 |
| Polyisocyanate ("Nacconate 1080H" supplied by Allied Chemical & Dye Corp.) | g | 51.9 |
| Water | g | 1.6 |
| N-ethyl morpholine | cc | 0.7 |

Non-ionic wetting agent (condensation product of castor oil with ethylene oxide—"Emulphor EL-719" supplied by General Dyestuff Corp.)___g__ 0.5

The polyisocyanate used in this example was essentially a triisocyanate made by reacting toluene diisocyanate (80% 2,4-isomer and 20% 2,6-isomer) with a triol such as trimethylolpropane, being a clear liquid with a viscosity of 150–200 cps. at 25° C., F.P.—40° C.; B.P. 247° C.; NCO-equivalent 120. The polyester was mixed with the requisite amounts of water, N-ethyl morpholine and Emulphor EL-719. The polyisocyanate was then added and blended in by rapid agitation for about 20 seconds. After pouring into a mold the foam rose for about 3¼ minutes. Cure was effected by placing in an oven at 100° C. for 2 hours. The foamed product had excellent cell structure, a density of 2.5 lb./cu. ft. and a compressive strength at 10% deflection of 42 p.s.i.

F

Polyester prepared as in Example 7_____g__ 50.0
Polyisocyanate ("Nacconate 1080H" supplied by Allied Chemical & Dye Corp.)_____g__ 48.9
Water _____g__ 1.4
N-ethyl morpholine_____cc__ 0.5
Non-ionic wetting agent (condensation product of castor oil with ethylene oxide—"Emulphor EL-719" supplied by General Dyestuff Corp.)___g__ 0.5

The water, N-ethyl morpholine and the Emulphor EL-719 were mixed in thoroughly with the polyester. The polyisocyanate was added and the mixture was stirred rapidly for about 25 seconds. The resultant mixture was poured into a mold and allowed to rise. To complete the cure the foam was placed in an oven at 90° C. for about an hour. The foam product had excellent cell structure, a density of 2.9 lb./cu. ft. and a compressive strength at 10% deflection of 47 p.s.i.

G

Polyester prepared as in Example 2 _____g__ 50.0
Polymethylene polyphenylisocyanate ("PAPI" supplied by The Carwin Co.)_____g__ 50.3
Water _____g__ 1.0
N,N-diethylcyclohexylamine _____cc__ 1.8
Non-ionic wetting agent (condensation product of castor oil with ethylene oxide—"Emulphor EL-719" supplied by General Dyestuff Corp.) __g__ 0.5

The polymethylene polyphenylisocyanate employed in this example was a mixture of polyisocyanates represented by the formula

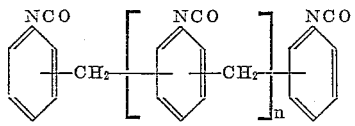

and having the average composition of the trimer i.e. $n$ has an average value of one. It is a liquid with an isocyanate equivalent of 138.5, a viscosity of 500–1500 cps. at 21° C. and a specific gravity (20°/4° C.) of 1.2. The polyester was thoroughly mixed with the indicated amounts of water, N,N-diethylcyclohexylamine and Emulphor EL-719. The polyisocyanate was added and the mixture was stirred rapidly for about 20 seconds. After pouring into a mold the foam rose for about 3 minutes. Cure was effected by placing in an oven at 100° C. for 1½ hours. The foamed product had fine, uniform cell structure, chiefly closed cell, a density of 5.1 lb./cu. ft. and a compressive strength at 10% deflection of 70 p.s.i.

H

Polyester prepared as in Example 8 _____g__ 50.0
Polymethylene polyphenylisocyanate ("PAPI" supplied by The Carwin Co.) _____g__ 48.8
Water _____g__ 1.0
N,N-diethylcyclohexylamine _____cc__ 1.8
Non-ionic wetting agent (condensation product of castor oil with ethylene oxide—"Emulphor EL-719" supplied by General Dyestuff Corp.)__g__ 0.5

The polyester was thoroughly mixed with the indicated amounts of water, N,N-diethylcyclohexylamine and Emulphor EL-719. The polyisocyanate was added and the mixture was stirred rapidly for about 20 seconds. After pouring into the mold the foam rose for about 3 minutes. Cure was effected by placing in an oven at 100° C. for 2 hours. The foamed product had fine, uniform cell structure, a density of 4.8 lb./cu. ft. and a compressive strength at 10% deflection of 63 p.s.i.

I

Polyester prepared as in Example 9 _____g__ 50.0
Polymethylene polyphenylisocyanate ("PAPI" supplied by The Carwin Co.) _____g__ 49.6
Water _____g__ 1.0
N,N-diethylcyclohexylamine _____cc__ 1.8
Non-ionic wetting agent (condensation product of castor oil with ethylene oxide—"Emulphor EL-719" supplied by General Dyestuff Corp.)___g__ 0.5

The polyester was thoroughly mixed with the indicated amounts of water, N,N-diethylcyclohexylamine and Emulphor EL-719. The polyisocyanate was added and the mixture was stirred rapidly for about 20 seconds. After pouring into the mold the foam rose for about 2 minutes. Cure was effected by placing in an oven at 100° C. for 1½ hours. The foamed product had fine, uniform cell structure, a density of 5.2 lb./cu. ft. and a compressive strength at 10% deflection of 78 p.s.i.

Having thus described our invention, what we claim and desire to protect by Letters Patent is:

1. A method of making a rigid polyurethane foam comprising providing a modified polyester in which one mole of an acidic material selected from the group consisting of adipic acid, mixture of adipic acid with phthalic anhydride and mixture of adipic acid with chlorendic anhydride was first esterified with one-third mole of a trihydride alcohol selected from the group consisting of trimethylolethane and trimethylolpropane to provide an intermediate polyester having terminal carboxyl groups and a hydroxyl number of zero, and one-third mole of the said intermediate polyester was thereafter further esterified with from 1.0 to 1.2 moles of a glycol selected from the group consisting of ethylene glycol and diethylene glycol to provide a modified polyester having an acid number not greater than 30 characterized by lower viscosity and more uniform molecular weight than would be obtained by esterifying said acidic material with both said trihydric alcohol and said glycol simultaneously, thereafter mixing one-third mole of said modified polyester with 6 to 10 isocyanate equivalents of an organic polyisocyanate, thereby providing a prepolymer composition, and subsequently mixing one isocyanate equivalent of the thus-produced prepolymer composition with an additional 0.03 to one-third mole of said modified polyester and 0.05 to 0.5 mole of water, whereby a rigid polyurethane foam is produced.

2. A method of making a rigid polyurethane foam comprising providing a modified polyester in which one mole of an acidic material selected from the group consisting of adipic acid, mixture of adipic acid with phthalic anhydride and mixture of adipic acid with chlorendic anhydride was first esterified wtih one-third mole of a trihydric alcohol selected from the group consisting of trimethylolethane and trimethylolpropane to produce an intermediate polyester having terminal carboxyl groups and a hydroxyl number of substantially zero, and one-third mole of the said intermediate polyester was thereafter further esterified with from 1.0 to 1.2 moles of a glycol selected from the group consisting of ethylene glycol and diethylene glycol to provide a modified polyester having an acid number not greater than 30 characterized by lower viscosity and more uniform molecular weight than would be obtained by esterifying said acidic material with both the said trihydric alcohol and the said glycol simultaneously, thereafter mixing one-third mole of said modified polyester with 3 to 5 moles of an organic diisocyanate, thereby providing a prepolymer composition, and subsequently mixing one isocyanate equivalent of the thus-produced prepolymer composition with an additional 0.03 to one-third mole of said modified polyester and 0.05 to 0.5 mole of water, whereby a rigid polyurethane foam is produced.

3. A method as in claim 2, in which the said polyisocyanate is toluene diisocyanate.

References Cited in the file of this patent

UNITED STATES PATENTS

| | | |
|---|---|---|
| 2,019,510 | Sorenson | Nov. 5, 1935 |
| 2,499,365 | De Groote et al. | Mar. 7, 1950 |
| 2,621,166 | Schmidt et al. | Dec. 9, 1952 |
| 2,779,689 | Reis | Jan. 29, 1957 |
| 2,863,855 | Wilson et al. | Dec. 9, 1958 |
| 2,868,739 | Nischk et al. | Jan. 13, 1958 |

UNITED STATES PATENT OFFICE
CERTIFICATE OF CORRECTION

Patent No. 3,018,256　　　　　　　　　　　　　January 23, 1962

Mitchell Borr et al.

It is hereby certified that error appears in the above numbered patent requiring correction and that the said Letters Patent should read as corrected below.

Column 10, lines 41 and 42, for "trihydride" read -- trihydric --.

Signed and sealed this 15th day of May 1962.

(SEAL)
Attest:

ERNEST W. SWIDER
Attesting Officer

DAVID L. LADD
Commissioner of Patents